(12) United States Patent
Nakase (10) Patent No.: US 10,244,199 B2
(45) Date of Patent: Mar. 26, 2019

(54) IMAGING APPARATUS (71) Applicant: CANON KABUSHIKI KAISHA, Tokyo (JP)

(72) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 15/354,893

(22) Filed: Nov. 17, 2016

(65) Prior Publication Data

US 2017/0150091 A1  May 25, 2017

(30) Foreign Application Priority Data

Nov. 24, 2015 (JP) ................... 2015-229042
Sep. 21, 2016 (JP) ................... 2016-184690

(51) Int. Cl.
  *H04N 5/77* (2006.01)
  *H04N 9/804* (2006.01)
  *H04N 101/00* (2006.01)

(52) U.S. Cl.
  CPC ........... *H04N 5/772* (2013.01); *H04N 9/8042* (2013.01); *H04N 2101/00* (2013.01)

(58) Field of Classification Search
  CPC ............... H04N 5/772; H04N 5/23245; H04N 5/23216; H04N 5/23293
  USPC .......................................... 348/222.1, 220.1
  See application file for complete search history.

(56) References Cited

U.S. PATENT DOCUMENTS

2016/0026438 A1 * 1/2016 Wolfram ................. G06F 17/30
717/109

FOREIGN PATENT DOCUMENTS

JP    2011-244423 A    12/2011

* cited by examiner

*Primary Examiner* — Yogesh K Aggarwal
(74) *Attorney, Agent, or Firm* — Canon U.S.A., Inc. IP Division (57) ABSTRACT

An imaging apparatus includes: a recording unit configured to record RAW image data into a recording medium in accordance with a recording instruction; a setting unit configured to control whether to set the RAW image data as a target of storage into the recording medium or not in accordance with a user instruction; a development unit configured to perform development processing on RAW image data; and a control unit configured to perform control to automatically develop the RAW image data recorded in the recording medium after recording of the RAW image data and to automatically record the developed image data into the recording medium. In a case where RAW image data not set as the target of storage has been developed by the development unit, the control unit performs control to automatically delete said RAW image data from the recording medium.

19 Claims, 4 Drawing Sheets

IMAGING APPARATUS

BACKGROUND

Field of Art

Aspects of embodiments of the present invention relate to an imaging apparatus.

Description of the Related Art

In related art, an imaging apparatus such as a digital camera performs development processing (processing of generating image data in a format recognizable as an image) on a raw image captured by an imaging unit (RAW image). It is common to perform compression coding on the developed image data and record the compressed data into a recording medium.

Some imaging apparatuses are capable of recording a RAW image. An example of such an apparatus is disclosed in Japanese Patent Laid-Open No. 2011-244423. As compared with a JPEG image, a RAW image is advantageous in that it is possible to minimize a decrease in image quality, although the amount of data necessary for recording is huge.

In order to process a large amount of data such as RAW image data at a high speed, hardware that has high processing capability is necessary. However, hardware that has high processing capability is large in circuit size and high in power consumption. Moreover, there is a possibility of high cost because a memory that has large capacity is required.

The number of pixels of an image that an imaging unit is capable of capturing has recently been increasing. As the number of imaging pixels increases, so does the load of processing for development of a RAW image. For this reason, hardware that has high processing capability is necessary for realizing real-time development processing concurrent with shooting without sacrificing high shooting functionality, for example, continuous shooting speed.

On the other hand, it is conceivable to record a RAW image only at the time of shooting, and to perform development processing later when the necessity of image display or printing arises. However, a RAW image data format is a unique format of each individual manufacturer of imaging apparatuses. For this reason, it is not possible to develop a RAW image recorded by an imaging apparatus of a certain manufacturer on a device of other manufacturer properly, which will result in poor user-friendliness.

SUMMARY

The technique disclosed herein provides an imaging apparatus that is capable of recording a necessary image efficiently while suppressing an increase in circuit size and power consumption, without sacrificing high shooting functionality.

An imaging apparatus according to an embodiment of the invention may be an imaging apparatus. The imaging apparatus may include an imaging unit. The imaging apparatus may include a generation unit configured to generate RAW image data by using image data acquired by the imaging unit. The imaging apparatus may include a recording unit configured to record the RAW image data generated by the generation unit into a recording medium in accordance with a recording instruction. The imaging apparatus may include a setting unit configured to control whether to set, as a target of storage into the recording medium, the RAW image data to be recorded into the recording medium by the recording unit in accordance with the recording instruction or not in accordance with a user instruction. The imaging apparatus may include a setting unit configured to control whether to set, as a target of storage into the recording medium, the RAW image data to be recorded into the recording medium by the recording unit in accordance with the recording instruction or not in accordance with a user instruction. The imaging apparatus may include a setting unit configured to control whether to set, as a target of storage into the recording medium, the RAW image data to be recorded into the recording medium by the recording unit in accordance with the recording instruction or not in accordance with a user instruction. The imaging apparatus may include a development unit configured to generate developed image data by performing development processing on RAW image data. The imaging apparatus may include a control unit configured to control the development unit to automatically develop the RAW image data recorded in the recording medium after recording of the RAW image data into the recording medium by the recording unit and configured to control the recording unit to automatically record the developed image data, which is generated by developing the RAW image data by the development unit, into the recording medium. In a case where first RAW image data not set as the target of storage into the recording medium has been developed by the development unit, the control unit may perform control to automatically delete the first RAW image data from the recording medium, and, in a case where second RAW image data set as the target of storage into the recording medium has been developed by the development unit, the control unit may perform control not to delete the second RAW image data from the recording medium.

Further features of embodiments of the present invention will become apparent from the following description of exemplary embodiments with reference to the attached drawings.

DESCRIPTION OF THE EMBODIMENTS

Some exemplary embodiments of the present invention will now be explained in detail. The exemplary embodiments described below are mere examples for implementation of the present invention. Depending on the structure of an apparatus to which the present invention is applied, and/or depending on various conditions, the disclosed embodiments shall be modified or altered appropriately. The exemplary embodiments described below shall not be construed as any restriction on the scope of the present invention. Some parts of the exemplary embodiments described below may be combined as needed.

To give a detailed explanation of an imaging apparatus according to the present embodiment, a digital camera capable of picking up and recording still-picture/moving-picture RAW image data is described below. Though a digital camera is described as an example of an imaging apparatus 100 in the present embodiment, it may be other kind of device, for example, a mobile phone with a built-in camera such as a smartphone (including an eyeglass-type or wristwatch-type wearable terminal), or an information processing apparatus such as a tablet terminal or a personal computer (PC) with a built-in camera.

Structure of Apparatus

First, with reference to FIG. 1, the structure and functions of an imaging apparatus 100 according to the present embodiment will now be explained.

The imaging apparatus 100 of the present embodiment generates RAW image data from an image signal acquired by an imaging unit 102. In a shooting standby state (recording standby state), the RAW image data is developed in a simplified manner and is displayed on a display unit 123. When a recording start instruction is given by a user, the RAW image data is recorded into a recording medium 152; however, no developed image data is recorded into the recording medium 152. The user is able to set image data that is to be finally recorded into the recording medium 152 and to give a recording instruction. That is, the user is able to choose one of the following options: to store the RAW image data but not store the developed image data; to store both the RAW image data and the developed image data; to store the developed image data but not store the RAW image data.

Regardless of which one of these settings was made by the user, at the imaging apparatus 100, at the time of shooting in response to the recording instruction given by the user, the RAW image data only is recorded into the recording medium 152 without performing any development processing on the RAW image data. After the recording of the RAW image data into the recording medium 152, the imaging apparatus 100 checks whether the RAW image data was set as need-to-be-stored image data (target of storage) or not. In a case where the developed image data only was set as the need-to-be-stored image data, the imaging apparatus 100 reads the RAW image data out of the recording medium 152 and performs development processing thereon to generate the developed image data. After the recording of the generated developed image data into the recording medium 152, the imaging apparatus 100 automatically deletes the original RAW image data, from which the developed image data has been generated, from the recording medium 152.

Because of this structure, it is possible to record a large amount of image data into the recording medium 152 at a high speed without any need for using high-processing hardware capable of developing RAW image data at a high speed at the time of shooting in response to the recording instruction given by the user. In addition, as described above, in a case where the developed image data only was set as the need-to-be-stored image data, the imaging apparatus 100 reads the RAW image data out of the recording medium 152, performs development processing thereon, records the developed image data into the recording medium 152, and automatically deletes the original RAW image data. Since the RAW image data not needed by the user does not remain stored in the recording medium 152, it is possible to utilize the memory space efficiently.

In addition to a function of recording image data picked up by shooting a subject into the recording medium 152, the imaging apparatus 100 of the present embodiment has a function of reading image data out of a recording medium and performing development processing thereon to display the developed image, and a function of transmitting/receiving image data to/from an external storage or server (cloud).

Therefore, the imaging apparatus 100 of the present embodiment may be redefined as an image processing apparatus, a recording apparatus, a playback apparatus, a recording playback apparatus, a communication apparatus, or the like.

Figure 1:
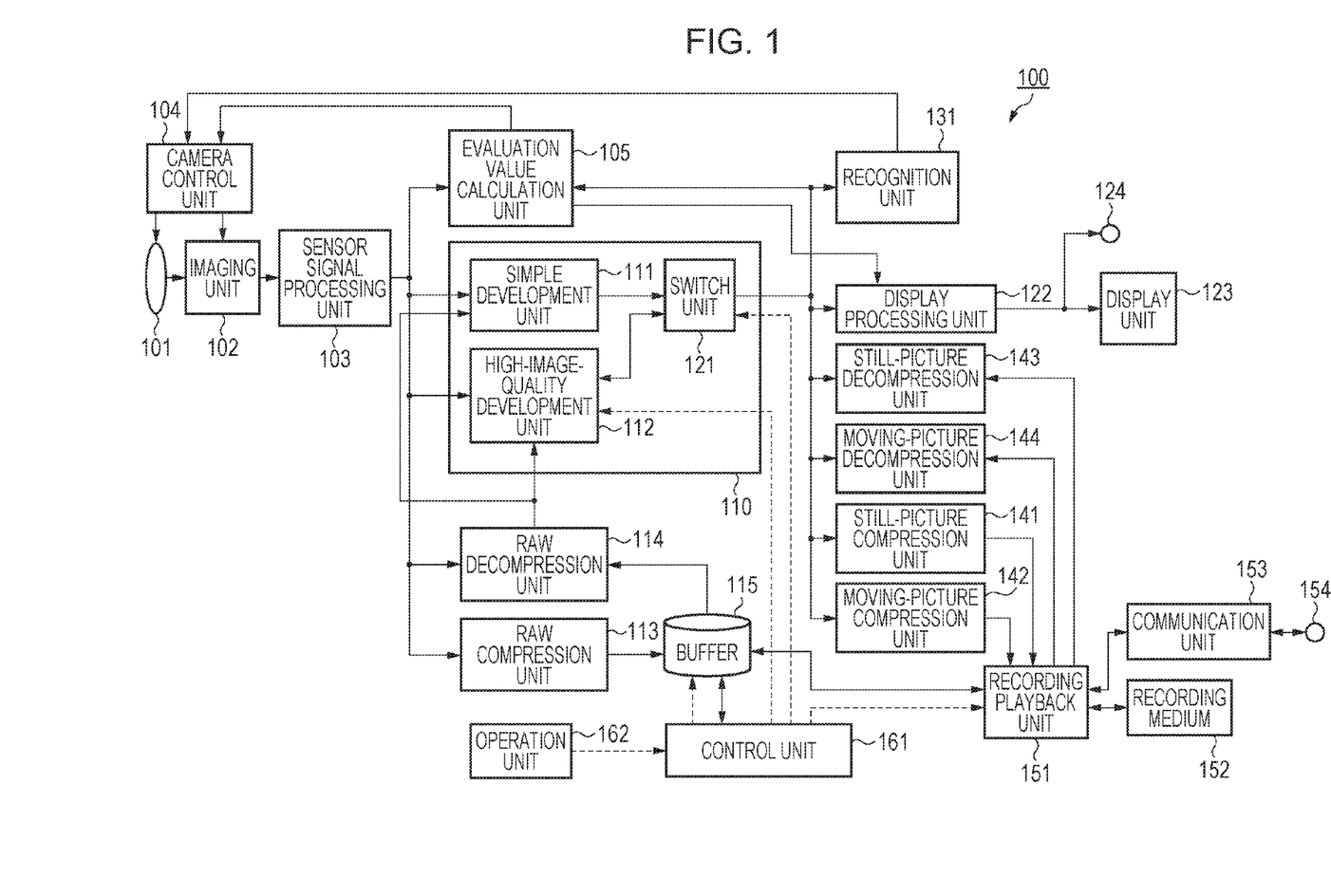
FIG. 1 is a block diagram that illustrates an example of the structure of an imaging apparatus according to an exemplary embodiment.

FIG. 1 is a block diagram that illustrates an example of the structure of the imaging apparatus 100 of the present embodiment. These functional blocks may be embodied in the form of dedicated hardware such as an ASIC. Alternatively, a general-purpose processor such as an MPU may run a program to embody them in the form of software.

In FIG. 1, a control unit 161 controls the overall processing of the imaging apparatus 100. The control unit 161 includes a programmable processor, for example, a CPU or an MPU. In addition, the control unit 161 includes a nonvolatile memory for storing a control program that is to be run by the programmable processor. The control unit 161 performs control in accordance with an instruction given by the control program stored in the nonvolatile memory. Signal lines for control and communication are connected from the control unit 161 to the functional blocks, although, for simplicity, only some of them are illustrated in FIG. 1. An operation unit 162 includes an input device such as keys, buttons, and a touch panel, etc. used by a user for giving an instruction to the imaging apparatus 100. An operation signal outputted from the operation unit 162 is detected by the control unit 161. The control unit 161 controls other functional blocks, etc. so that operation corresponding to the detected manipulation will be performed. An image captured or played back by the imaging apparatus 100, a menu screen, and various kinds of information are provided to the display unit 123 via a display processing unit 122. The display unit 123 displays them. The display unit 123 includes, for example, a liquid crystal display (LCD), etc.

The operation unit 162 is manipulated to turn on the power of the imaging apparatus 100. The control unit 161 puts the imaging apparatus 100 into a shooting standby state when powered on. In the shooting standby state, an image of the subject, which is the target to be imaged, is formed on the imaging unit 102 through an optical unit 101. In a live-view mode, the image captured by the imaging unit 102 is displayed as a live-view image on the display unit 123. In response to a recording start instruction inputted from the operation unit 162, the control unit 161 starts shooting processing and recording processing. The operation of the optical unit 101 and the imaging unit 102 is controlled by a camera control unit 104 on the basis of evaluation value calculation results obtained by an evaluation value calculation unit 105, for example, the scores of aperture, focus, and blurring caused by hand-held camera shake, and on the basis of subject information inputted from a recognition unit 131.

The imaging unit 102 converts, into an electric signal, light having passed through a red, green, blue (RGB) color filter provided for each pixel. For example, the imaging unit has a CCD image sensor or a CMOS image sensor. The pixel array of an image processed by the imaging apparatus 100 has, for example, a regular arrangement structure in which red (R), green (G), and blue (B) pixels are arranged in a mosaic pattern wherein one red pixel, one blue pixel, and two green pixels constitute a set of 2×2 four pixels. In general, such a color filter array is called as primary color Bayer pattern. The number of pixels of the imaging unit 102 of the present embodiment is 4K (horizontal 3,840 pixels× vertical 2,160 pixels). However, the number of pixels may be greater than 4K. The imaging unit 102 of the present embodiment is capable of outputting image data of 4K per frame at a frame rate of sixty frames per second (fps). The constituent colors and array pattern of the color filter are not limited to those of primary color Bayer pattern. Other alternative array pattern may be adopted.

A sensor signal processing unit 103 performs pixel repair processing on the image signal acquired by the imaging unit 102. The repair processing includes interpolation using the values of surrounding pixels to compensate for the value of a missing pixel or a low-reliability pixel in the imaging unit 102 and subtraction of a predetermined offset value from the value of the repair target pixel. In the present embodiment, image data outputted from the sensor signal processing unit 103 is referred to as RAW image data or RAW image, which means a yet-to-be-developed image.

The RAW image data outputted from the sensor signal processing unit 103 undergoes development processing at a development unit 110. The development unit 110 includes a plurality of development processing units. These development processing units are different from each other, or one another, in terms of processing precision and processing load. The development unit 110 of the present embodiment includes two development units, which are a simple development unit 111 and a high-image-quality development unit 112, and further includes a switch unit 121 for selecting either one of the outputs of these two development units. The simple development unit 111 performs first development processing, and the high-image-quality development unit 112 performs second development processing. Both the simple development unit 111 and the high-image-quality development unit 112 perform, on the RAW image, development processing such as de-Bayer processing (called also as de-mosaic processing or color interpolation processing), white balance adjustment, conversion from RGB (primary colors) to YUV (luminance and chrominance), noise reduction, and optical distortion correction, etc. Those enumerated above are examples of processing included in the development processing. The above description does not mean that all of them are indispensable to development. The development processing may include other kind of processing. A part of those enumerated above may be omitted from the development processing.

The high-image-quality development unit 112 performs each processing with higher precision as compared with the simple development unit 111. Though it is possible to obtain a developed image of higher image quality because of higher precision as compared with the simple development unit 111, the load of processing is heavier. Since the processing precision of the simple development unit 111 is lower than that of the high-image-quality development unit 112, the image quality obtained by using the simple development unit 111 is lower as compared with the high-image-quality development unit 112; however, the simple development unit 111 is capable of performing development processing at a high speed during shooting. Therefore, in the present embodiment, the high-image-quality development unit 112 is used not for real-time development concurrent with shooting but for performing, while taking time, development processing during an idle period after shooting. As described above, high-image-quality development processing is not performed at the time of shooting in response to the recording instruction given by the user but performed later while taking time after the recording of the RAW image into the recording medium 152. This makes it possible to suppress an increase in circuit size and power consumption (peak). The processing load of the simple development unit 111 is light. Therefore, the simple development unit 111 is used for generating a live-view display image when real-time development concurrent with shooting is performed in a shooting standby state. The switch unit 121 is switched by the control unit 161 in accordance with the content of operation instructed by the user from the operation unit 162 or the mode of operation executed currently.

In the structure of the present embodiment, the simple development unit 111 and the high-image-quality development unit 112 exist independently of each other inside the development unit 110. However, a single development unit may have a plurality of operation modes including a simple development processing mode and a high-image-quality development processing mode, and simple development processing and high-image-quality development processing may be performed by switching between these operation modes. It is sufficient as long as the processing loads of the plurality of development processing units are different from each other or one another. It is not always necessary to reduce both the size of an image that is processed and processing precision. For example, development processing units that perform processing for the same number of pixels but are different from each other in terms of processing precision may be included. Development processing units that are different from each other in terms of the number of pixels but are the same in terms of processing precision may be included. However, at least one development processing unit capable of completing the development processing of a one-screen RAW image outputted from the imaging unit 102 no later than the start of shooting of the next one-screen RAW image should be included.

Though it is illustrated in FIG. 1 as if the RAW image data outputted from the sensor signal processing unit 103 were inputted into the simple development unit 111 and the high-image-quality development unit 112 of the development unit 110, this does not mean that the development processing is performed on one and the same RAW image data at both of the development processing units. From the viewpoint of the burden of processing, basically, one development processing unit only executes the development processing. Therefore, the switch unit 121 may be provided as an input switcher to set which one of the development processing units should receive the RAW image data input.

The image data developed by the development unit 110 (developed image data) undergoes predetermined processing at the display processing unit 122. After that, the processed data is displayed on the display unit 123. The developed image data may be outputted to an external display device connected via a video output terminal 124. The video output terminal 124 includes a general-purpose interface, for example, HDMI (Registered Trademark) or SDI.

The image data developed by the development unit 110 is supplied also to the evaluation value calculation unit 105. The evaluation value calculation unit 105 calculates evaluation values regarding a focus state and an exposure state, etc. from the developed image data. These evaluation values are used, for example, for automatic focal point detection and for automatic exposure control by the control unit 161.

The image data developed by the development unit 110 is supplied also to the recognition unit 131. The recognition unit 131 has a function of detecting and recognizing subject information contained in the image data. For example, the recognition unit 131 detects the face of a person included in an image displayed on the basis of the image data, and outputs information indicative of the position and size, etc. of the face upon detection. The recognition unit 131 may further perform authentication processing for a particular person, etc. on the basis of feature information such as the features of the face.

The image data developed by the development unit 110 is supplied also to a still-picture compression unit 141 and a moving-picture compression unit 142. In the present embodiment, as described earlier, at the time of shooting in response to the recording instruction given by the user, no development processing by the high-image-quality development unit 112 is performed. For this reason, as described earlier, at the time of shooting in response to the recording instruction given by the user, no compression processing by the still-picture compression unit 141 and the moving-picture compression unit 142 is performed. In a case where still-picture data for recording is generated from the developed image data, the still-picture compression unit 141 is used. Conforming to a known coding scheme such as JPEG, the still-picture compression unit 141 compresses and encodes the developed still-picture data to generate still-picture data for recording. In a case where moving-picture data for recording is generated from the developed image data, the moving-picture compression unit 142 is used. Conforming to a known coding scheme such as H. 264 or H. 265, the moving-picture compression unit 142 compresses and encodes the developed moving-picture data to generate moving-picture data for recording. The still-picture compression unit 141 is configured to perform high-efficiency coding (compression coding) on still-picture image data to generate compressed image data having a reduced information amount. The moving-picture compression unit 142 is configured to perform high-efficiency coding (compression coding) on moving-picture image data to generate compressed image data having a reduced information amount. The compressed image data is sent to a recording playback unit 151.

A RAW compression unit 113 applies high-efficiency coding such as wavelet transformation and differential coding, etc. to the RAW image data outputted from the sensor signal processing unit 103, and generates compressed RAW image data having a reduced information amount. The RAW compression unit 113 stores the compressed RAW image data into a buffer unit 115. The buffer unit 115 may be any storage device such as a memory or a hard disk. The compressed RAW image data is temporarily stored into the buffer unit 115 at the time of shooting in response to the recording instruction given by the user. After that, the stored image data is read out of the buffer unit 115 at an appropriate point in time to be recorded into the recording medium 152. That is, the buffer unit 115 is not the final storage destination of the RAW image data or the developed image data but is a temporary storage for buffering the RAW image data or the developed image data that is to be finally recorded into the recording medium 152.

The recording playback unit 151 records, into the recording medium 152, the still-picture data stored temporarily into the buffer unit 115 from the still-picture compression unit 141 and/or the moving-picture data stored temporarily into the buffer unit 115 from the moving-picture compression unit 142. The recording playback unit 151 records the still-picture and/or moving-picture RAW image data read out of the buffer unit 115 into the recording medium 152 in the form of a different file separately from the compression-coded still-picture and/or moving-picture data. The recording playback unit 151 manages the data recorded in the recording medium 152 as files conforming to a known file system such as FAT. The recording medium 152 is, for example, a built-in large-capacity memory, a hard disk, or a removable memory card. The recording playback unit 151 is capable of reading a still-picture file, a moving-picture file, or a RAW file (still-picture/moving-picture) out of the recording medium 152. Moreover, the recording playback unit 151 is capable of writing various kinds of data and files into, and read them out of, an external storage or an external server via a communication unit 153. The communication unit 153 provides the imaging apparatus 100 with a wireless communication access or a wired communication access to a computer network or an external device via a communication terminal 154.

The recording playback unit 151 acquires, from the recording medium 152, or from an external source via the communication unit 153, a file that the user wants to be played back. If the file that is to be played back is a RAW file, the recording playback unit 151 stores the RAW image data of the acquired RAW file into the buffer unit 115. If the file that is to be played back is a still-picture file, the recording playback unit 151 supplies the still-picture data of the acquired still-picture file to a still-picture decompression unit 143. If the file that is to be played back is a moving-picture file, the recording playback unit 151 supplies the moving-picture data of the acquired moving-picture file to a moving-picture decompression unit 144.

A RAW decompression unit 114 reads out the compressed RAW image data stored in the buffer unit 115 and performs decoding for data decompression. The RAW image data decoded by the RAW decompression unit 114 is supplied to the simple development unit 111 and the high-image-quality development unit 112 of the development unit 110.

In a case where the file acquired from the recording medium 152, or from an external source via the communication unit 153, is a RAW file, the recording playback unit 151 of the present embodiment is capable of, after the completion of development processing at the development unit 110, deleting the original RAW file from the recording medium 152, or from the external storage, server, etc. via the communication unit 153.

The still-picture decompression unit 143 decodes the inputted still-picture data, and supplies the decoded data as a still-picture playback image to the display processing unit 122. The moving-picture decompression unit 144 decodes the inputted moving-picture data, and supplies the decoded data as a moving-picture playback image to the display processing unit 122. The still picture or the moving picture processed by the display processing unit 122 is displayed on the display unit 123. Explanation of Operation in Shooting Mode Next, with reference to the flowchart of FIG. 2, operation in a shooting mode of the imaging apparatus 100 of the present embodiment will now be explained.

Figure 2:
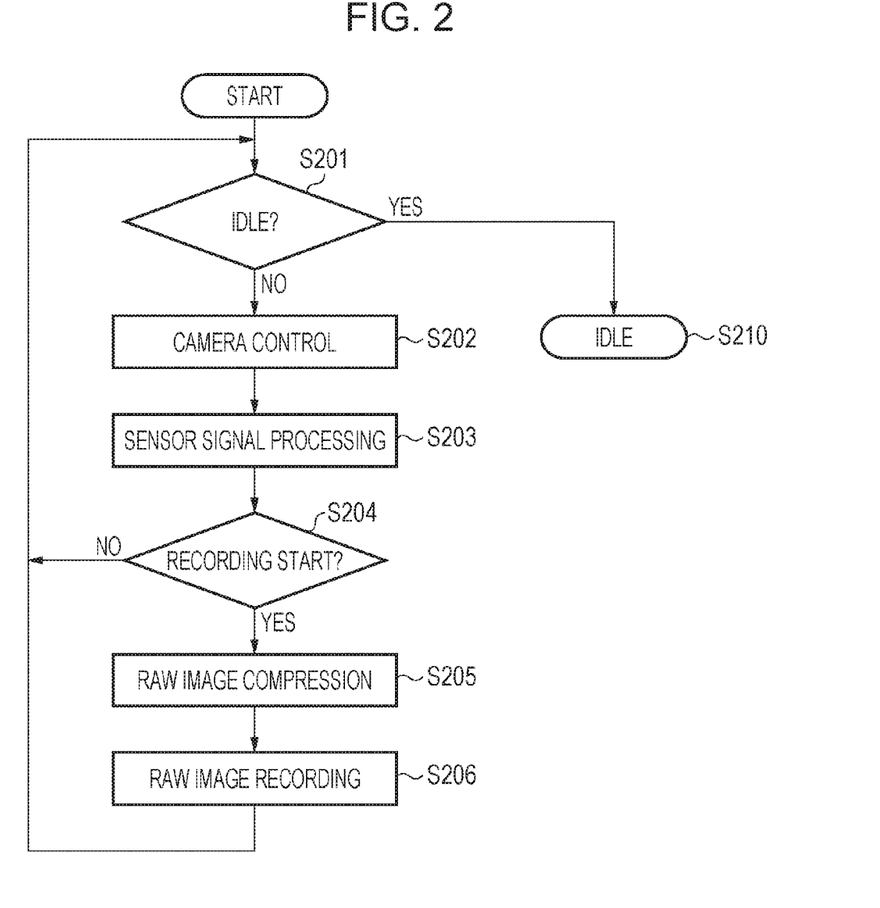
FIG. 2 is a flowchart that illustrates processing in a shooting mode of the embodiment.

Unless otherwise specified, the flowchart of FIG. 2 illustrates the steps of processing realized by controlling the functional blocks illustrated in FIG. 1 by the control unit 161. Specifically, the illustrated processing is realized by reading the program stored in the nonvolatile memory of the control unit 161 out into another memory (RAM) and running the read program by the CPU.

In FIG. 2, if the imaging apparatus 100 was set to be in the shooting mode or is switched into the shooting mode when the power is turned on via the operation unit 162, the default state upon power activation is the shooting standby state.

In S201, the control unit 161 determines whether the processing load of the imaging apparatus 100 is light or not. In a case where the processing load is heavy, the state shifts into an idle state of S210 at a frequency that corresponds to the heavy load status. In a case where the processing load is not heavy, the process proceeds to S202. It is possible to determine whether the processing load is heavy or not on the basis of, for example, the usage ratio of the CPU of the control unit 161, or depending on whether predetermined heavy-load operation such as high-speed continuous shooting operation is currently performed or not. However, the criterion for load judgment is not limited to these examples.

In S202, the camera control unit 104 controls the operation of the optical unit 101 and the imaging unit 102 so as to ensure the execution of shooting processing under optimum shooting conditions. For example, in accordance with a zoom instruction or a shooting preparation instruction given by the user via the operation unit 162, the control unit 161 moves a zoom lens or a focus lens included in the optical unit 101, and sets the readout area of the imaging unit 102 in accordance with an instruction on the number of imaging pixels. On the basis of evaluation value information supplied from the evaluation value calculation unit 105 and subject information supplied from the recognition unit 131, the control unit 161 performs control processing, for example, for focusing on and for tracking the specified subject. The control of S202 is performed under shooting conditions corresponding to a predetermined frame cycle.

In the shooting standby state in the shooting mode, via the operation unit 162, the user is able to specify the type of the image stored finally into the recording medium 152 after development processing is performed by the development unit 110. In the present embodiment, for example, the user is able to set any one of a plurality of recording modes (storage modes) depending on the type of the image that needs to be stored. The plurality of recording modes includes a mode for recording the RAW image but not recording the developed image, a mode for recording both the RAW image and the developed image, and a mode for recording the developed image but not recording the RAW image. With regard to both of the RAW image and the developed image, it is possible to perform still-picture recording and/or moving-picture recording. In a case where it is set into a developed image recording mode, the user is able to set the screen size (the number of pixels) and image quality (compression ratio) of the developed image to be recorded.

In S203, the sensor signal processing unit 103 performs signal processing for a pixel repair on the image signal acquired by the imaging unit 102. That is, the sensor signal processing unit 103 performs interpolation processing using the values of surrounding pixels and predetermined offset value subtraction processing on an electric signal corresponding to a missing pixel of an imager and an electric signal corresponding to a low-reliability pixel.

In S204, the control unit 161 determines whether there is an input of a recording start instruction by the user via the operation unit 162 or not. The process proceeds to S205 if there is an input of a recording start instruction. If not, the process loops back to S201 for repetition.

In S205, the control unit 161 responds to the recording start instruction, and the camera control unit 104 controls the optical unit 101 and the imaging unit 102 to start recording processing. The RAW compression unit 113 acquires the RAW image data from the sensor signal processing unit 103, and generates compressed RAW data by applying, to the RAW image data, high-efficiency coding (RAW compression) for reducing the amount of information. The compressed RAW image data is stored temporarily into the buffer unit 115. In a case of still-picture shooting, the RAW compression unit 113 performs high-efficiency coding processing on RAW image data corresponding to one picture acquired by the imaging unit 102, thereby converting it into compressed RAW image data. In a case of moving-picture recording, the RAW compression unit 113 performs high-efficiency coding processing sequentially on RAW image data of plural frames outputted from the sensor signal processing unit 103 in a predetermined frame cycle, thereby generating compressed RAW image data. To encode the RAW image data, reversible coding or irreversible coding, whichever is preferred, may be used. When the RAW image data is recorded, the compression of the RAW image data by the RAW compression unit 113 may be omitted, that is, RAW compression data that is in a non-compressed state may be recorded. In the present embodiment, irrespective of whether the RAW image data to be recorded is compressed or not, the recorded RAW image data has high image quality without any significant deterioration from the image data supplied from the sensor signal processing unit 103.

In S206, the control unit 161 causes the recording playback unit 151 to record the RAW image data generated by the RAW compression unit 113 into the recording medium 152. After the recording, the process returns to S201 to prepare for shooting again. In S206, for recording into an external storage or an external server, the recording playback unit 151 may transmit the RAW image data to the external storage or the external server from the communication terminal 154 via the communication unit 153. In such a case, the external storage or the external server is the final recording medium of the RAW image data or the developed image data. In a case of still-picture recording, RAW image data corresponding to one picture is recorded in response to the recording start instruction. In a case of moving-picture recording, the recording of RAW image data continues from the recording start instruction until a recording stop instruction is given by the user, meaning that the recording of the RAW image data stops in response to the recording stop instruction. As described earlier, in the present embodiment, at the time of recording in response to the recording instruction given by the user, no development processing is performed on the RAW image data at the development unit 110, and the RAW image data only is recorded into the recording medium 152.

The control unit 161 records, as additional information on the RAW image data recorded into the recording medium 152, setting information on the recording mode selected by the user in addition to the time and date of shooting and image size, etc. That is, the control unit 161 records identification information for identifying the selected one of the mode for recording the RAW image only, the mode for recording both the RAW image and the developed image (compressed image), and the mode for recording the developed image only, as the additional information on the RAW image data recorded into the recording medium 152. In addition to mode identification, the identification information is for identification as to whether the RAW image data recorded into the recording medium was set as the need-to-be-stored-in-medium image data or not. In a case where the mode set by the user is the mode for recording the developed image (compressed image), the information set by the user on the size and image quality (compression ratio), etc. of the developed image is also recorded as the additional information into the recording medium 152. The setting information regarding the recording mode may be added in the form of meta data contained in the RAW file containing the RAW image data. It may be added in the form of the attribute of a file system to which the recording medium 152 or the external storage or the external server conforms, for example, file name, archive attribute, hidden attribute, etc.

As described above, the imaging apparatus 100 of the present embodiment records RAW image data into the recording medium 152 in response to a recording start instruction given by the user in the shooting mode. The RAW image data is high-quality data without any significant loss in image quality from the image data supplied from the sensor signal processing unit 103, and no development processing is necessary for generating the RAW image data. For this reason, even if the number of imaging pixels or the speed of continuous shooting is increased, or even if the number of pixels per frame or the frame rate is increased, it is possible to record the RAW image data by means of a small-sized circuit that is low in power consumption.

Explanation of Operation in Idle State

Next, with reference to the flowchart of FIG. 3, operation in the idle state in S210 of FIG. 2 will now be explained.

In the present embodiment, in the idle state, if RAW image data that needs to be developed is recorded in the recording medium 152 or in an external storage or an external server, the imaging apparatus 100 reads the recorded RAW image data out of the recording medium 152 or out of the external storage or the external server, etc. and performs development processing thereon automatically. The imaging apparatus 100 compresses and encodes the developed image data automatically, and records the developed image data after the compression coding into the recording medium 152. Among the pieces of RAW image data recorded in the recording medium 152, those developed automatically in the idle state are the RAW image data recorded in the "developed-image-only storage" mode, in which the developed image only was set as the need-to-be-stored image, or the "both-RAW-and-developed storage" mode, in which both the RAW image and the developed image were set as the need-to-be-stored image.

The term "idle state" means a state in which the processing load of the imaging apparatus 100 is determined to be light. Examples of the idle state are: a shooting standby state, a standby state during image playback, and a sleep state. The development processing may be started not only automatically but also in accordance with an instruction given by the user. In the present embodiment, in the shooting standby state, the processing in S202 and S203 illustrated in FIG. 2 is performed repeatedly to display a live-view image on the display unit 123 also when idle.

The method of determining whether the imaging apparatus 100 is in the idle state or not is not specifically limited. Any determination method may be employed, including but not limited to a general processing load measurement method. For example, it is possible to determine the idleness by checking whether the usage ratio of the CPU of the control unit 161 is less than a predetermined threshold value or not or whether predetermined heavy-load operation such as high-speed rapid-fire shooting operation or recording/playback operation is currently performed or not. Alternatively, the state may be regarded as idle without any determination if the selected mode of operation is a mode in which, basically, light load processing only occurs.

Figure 3:
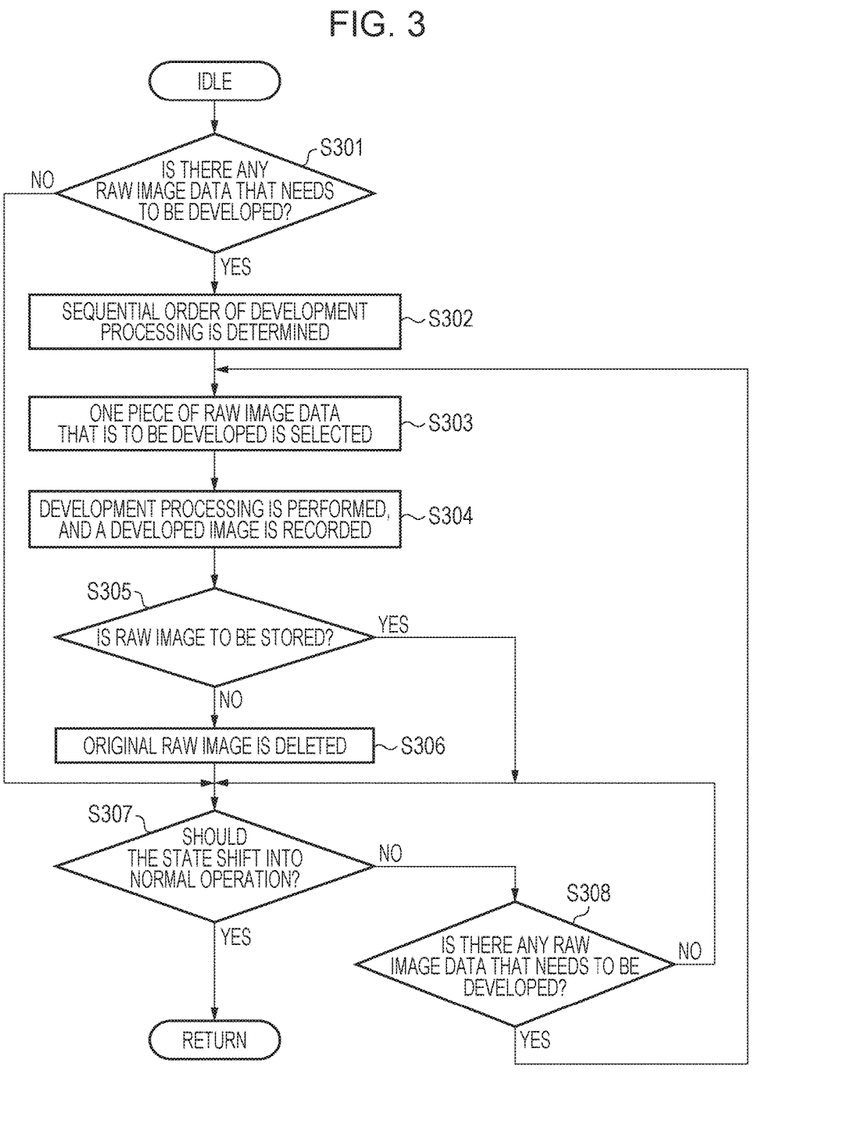
FIG. 3 is a flowchart that illustrates processing in an idle state illustrated in FIG. 2.

The flowchart of FIG. 3 illustrates the steps of processing realized by controlling the functional blocks by the control unit 161. Specifically, the illustrated processing is realized by reading the program stored in the memory (ROM) of the control unit 161 out into another memory (RAM) and running the read program by the CPU.

Upon the start of idle state processing illustrated in FIG. 3, the control unit 161 determines whether RAW image data that needs to be developed is recorded in the recording medium 152 or not. The control unit 161 checks the recording mode setting information or the meta data added to each RAW image data recorded in the recording medium 152. The control unit 161 determines that there exists RAW image data that needs to be developed in a case where the set recording mode is the "developed-image-only recording" mode, in which the developed image only is to be recorded, or the "both-RAW-and-developed recording" mode, in which both the RAW image and the developed image (compressed image) are to be recorded.

The process proceeds to S302 if it is determined in S301 that RAW image data that needs to be developed is recorded in the recording medium 152. If not, the process proceeds to S307.

In S302, for plural pieces of RAW image data that need to be developed, the control unit 161 determines the sequential order of development processing. Then, the process proceeds to S303. The method of determining the sequential order will be described later.

In S303, in accordance with the sequential order determined in S302, the control unit 161 selects one piece of RAW image data that is to be developed. The recording playback unit 151 reads the selected piece of RAW image data out of the recording medium 152, and stores it into the buffer unit 115. Then, the process proceeds to S304.

In S304, the following processing is performed. Under the control of the control unit 161, the RAW decompression unit 114 generates RAW image data by decompressing the compressed RAW image data read out from the recording medium 152 and stored into the buffer unit 115. The generated RAW image data is sent to the high-image-quality development unit 112, at which development processing is performed. The developed image data is outputted to the still-picture compression unit 141 or the moving-picture compression unit 142 through the switch unit 121. In a case where the RAW image data that is developed is still-picture RAW image data, the still-picture compression unit 141 compresses and encodes the developed still-picture data to generate still-picture data for recording. The recording playback unit 151 records the still-picture data for recording into the recording medium 152. In a case where the RAW image data that is developed is moving-picture RAW image data, the moving-picture compression unit 142 compresses and encodes the developed moving-picture data to generate moving-picture data for recording. The recording playback unit 151 records the moving-picture data for recording into the recording medium 152.

The high-image-quality development unit 112 performs so-called development processing. Specifically, the high-image-quality development unit 112 performs de-Bayer processing (de-mosaic processing), conversion into signals composed of luminance and chrominance (and primary colors), cancellation of noise contained in each signal, correction of optical distortion, and image normalization, etc. The size (the number of pixels) of the developed image generated by the high-image-quality development unit 112 remains the same as the number of all pixels read by the imaging unit 102 or turns into the number of pixels set by the user. Since the number of pixels of the image data outputted from the high-image-quality development unit 112 is greater than the number of pixels of the image data outputted from the simple development unit 111, the quality of the image data outputted from the high-image-quality development unit 112 is higher. However, the load of processing is heavier. Therefore, in the present embodiment, the high-image-quality development unit 112 does not perform real-time development processing concurrent with shooting, and RAW image data is recorded into the recording medium 152 at the time of recording. Then, in an idle state, other than shooting processing state, in which the load of processing is light, the RAW image data is read out of the recording medium 152, and development processing is performed. This makes it possible to suppress an increase in circuit size and power consumption while increasing the number of imaging pixels, increasing the speed of continuous shooting, or increasing the number of pixels per frame or the frame rate.

The image data developed by the high-image-quality development unit 112 is supplied to the still-picture compression unit 141 and the moving-picture compression unit 142. In a case where the developed image data is still-picture data, the still-picture compression unit 141 compresses and encodes the still-picture data in accordance with a known coding scheme such as JPEG. In a case where the developed image data is moving-picture data, the moving-picture compression unit 142 compresses and encodes the moving-picture data in accordance with a known coding scheme such as H. 264 or H. 265. The still-picture compression unit 141 is configured to perform high-efficiency coding (compression coding) on still-picture image data to generate compressed image data having a reduced information amount. The moving-picture compression unit 142 is configured to perform high-efficiency coding (compression coding) on moving-picture image data to generate compressed image data having a reduced information amount. The compressed image data is sent to the recording playback unit 151. The recording playback unit 151 records the developed compressed image data into the recording medium 152.

In S305, the control unit 161 determines whether to store the original RAW image data, for which development processing has now been performed in S304, or not. That is, in a case where it is determined that the original RAW image data was not set by the user to be stored, the processing proceeds to S306. In a case where it is determined that the original RAW image data was set by the user to be stored, the processing proceeds to S307. In other words, the original RAW image data is not deleted from the recording medium 152 if it is determined in S305 that the original RAW image data was set to be stored.

In S306, the control unit 161 controls the recording playback unit 151 to delete the original RAW image data, for which development processing has now been performed, from the recording medium 152. In a case where the original RAW image data is recorded in an external storage or an external server, the recording playback unit 151 controls the communication unit 153 to delete the original RAW image data recorded in the external storage or the external server. As described above, each time when a piece of developed compressed image data is recorded into the recording medium 152, the original RAW image data corresponding to the recorded compressed image data is deleted from the recording medium 152.

In S307, the control unit 161 determines whether to shift from the idle state into a normal operation state or not in accordance with an instruction given by the user or in accordance with mode setting. The process returns to S201 of FIG. 2 if determined by the control unit 161 to shift into a normal operation state. If not, the process proceeds to S308. For example, in a case where there is an input of a recording start instruction via the operation unit 162 in the idle state, shifting into a normal operation state in a shooting mode is executed. It may be shifted into other mode, for example, a playback mode.

In S308, the control unit 161 determines whether RAW image data that needs to be developed is recorded in the recording medium 152 or not. The process returns to S303 if it is determined that RAW image data that needs to be developed is recorded in the recording medium 152. Then, in accordance with the sequential order determined in S302, the next RAW file is selected, and processing in S303 and subsequent steps is repeated. If there is no RAW file that needs to be developed in the recording medium 152, the process returns to S307, and the idle state continues until shifting into a normal operation state.

Next, the method of determining the sequential order of development processing for plural pieces of RAW image data in S302 will now be explained.

The original RAW image data is deleted automatically after the recording of the developed image into the recording medium 152 in a case where the RAW image data was not set to be stored. For this reason, the sequential order of development processing is important. Therefore, in the present embodiment, the sequential order of development processing is determined in such a way as to be able to use the recording capacity of the recording medium 152 efficiently and thereby ensure long recording time, not in the order of the recording of the images.

In the present embodiment, in accordance with the types of images of the target of storage preset by the user, the sequential order is determined for RAW image data that are to be developed. Specifically, development processing for RAW image data that was not set as the need-to-be-stored image data by the user is performed before development processing for RAW image data that was set as the need-to-be-stored image data by the user. In a case where it was set by the user that both the RAW image and the developed image are to be stored, the RAW image data set as the need-to-be-stored image data and recorded in the recording medium 152 is developed. As described earlier, the RAW image data that was not set as the need-to-be-stored image data is deleted from the recording medium 152 after the recording of the developed image, whereas the RAW image data that was set as the need-to-be-stored image data is not deleted from the recording medium 152 even after the recording of the developed image. Therefore, as a result of determining the sequential order of development processing in such a way that development processing for RAW image data not set as the need-to-be-stored image data is to be performed before development processing for RAW image data set as the need-to-be-stored image data, the RAW image data not set as the need-to-be-stored image data are deleted sequentially upon completion of development processing, and, owing to the sequential deletion, it is possible to secure an available space of the recording medium 152 before the start of the development of the RAW image data set as the need-to-be-stored image data.

In a case where plural pieces of RAW image data not set as the need-to-be-stored image data are recorded in the recording medium 152, it is possible to determine the sequential order of development processing for these pieces of RAW image data not set as the need-to-be-stored image data on the basis of RAW image data size (data amount). For example, in a case of pieces of still-picture RAW image data, the time taken for development processing is almost the same, even if they vary in size from one to another. For this reason, the earlier the development processing of large-sized RAW image data is performed, the earlier the free space of the recording medium 152 can be secured. Therefore, with regard to pieces of RAW image data not set as the need-to-be-stored image data, development processing is performed in descending order of RAW image data size. In a case of pieces of moving-picture RAW image data, the longer the recording time is, the larger the size (data amount) is. For this reason, the time taken for development processing of moving-picture RAW image data varies significantly depending on the length of recording time. Therefore, for pieces of moving-picture RAW image data, it is possible to secure the free space of the recording medium 152 earlier by starting sequential development processing with small-sized ones with short recording times, as compared with a case where it begins with large-sized ones.

Figure 4A:
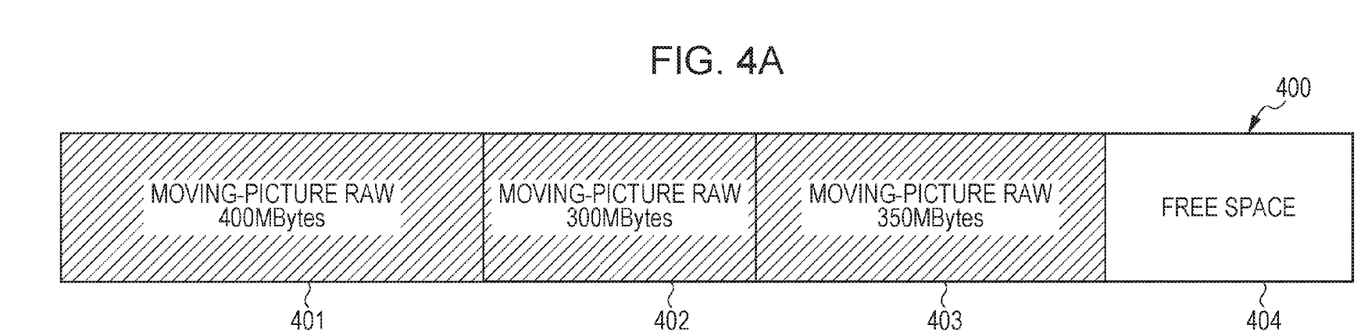
FIG. 4A is a diagram that illustrates an example of RAW image data picked up by the imaging apparatus of the embodiment.

Moving-picture RAW image data recorded in the recording medium 152 is illustrated in FIG. 4A. Moving-picture RAW 401 of 400 megabytes (MB), moving-picture RAW 402 of 300 MB, and moving-picture RAW 403 of 350 MB are recorded in the recording medium 152, the entire capacity of which is denoted as 400. The remaining space 404 is free. In a case where none of the RAW image data 401, 402, and 403 was set as the need-to-be-stored image data, development processing is performed in ascending order of size, that is, the moving-picture RAW 402 first, the moving-picture RAW 403 next, and, finally, the moving-picture RAW 401.

In a case where both moving-picture RAW image data and still-picture RAW image data are recorded in the recording medium 152, the user can decide which one of the two, that is, the moving-picture RAW image data or the still-picture RAW image data, should be developed first.

The sequential order of development processing may be determined depending on the mode of shooting. For example, a larger amount of processing time is required for a multi-shot image because it involves the process of synthesizing developed images with one another after development processing. In such a case, if development processing for still-picture RAW image data shot individually is performed first, not the multi-shot image, it is possible to delete the RAW image data earlier, thereby obtaining the free space of the recording medium 152 earlier.

Figure 4B:
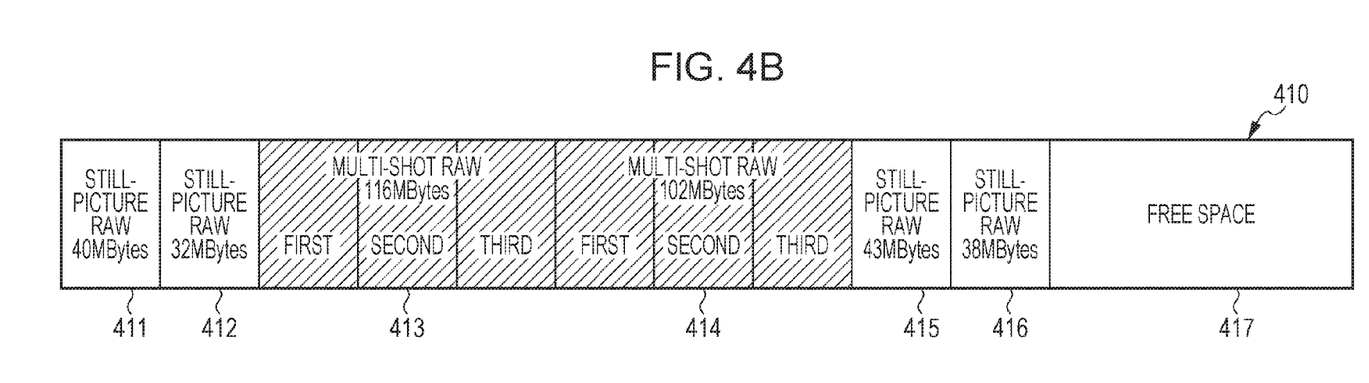
FIG. 4B is a diagram that illustrates another example of RAW image data picked up by the imaging apparatus of the embodiment.

Still-picture RAW image data recorded in the recording medium 152 is illustrated in FIG. 4B. Still-picture RAW 411 of 40 MB, still-picture RAW 412 of 32 MB, still-picture RAW 415 of 43 MB, still-picture RAW 416 of 38 MB, multi-shot RAW 413 of 116 MB, and multi-shot RAW 414 of 102 MB are recorded in the recording medium 152, the entire capacity of which is denoted as 410. The remaining space 417 is free. Each of the multi-shot RAW 413 and the multi-shot RAW 414 includes three pieces of still-picture RAW image data that are to be synthesized. In a case where none of the still-picture RAW image data illustrated in FIG. 4B was set as the need-to-be-stored image data, development processing is performed by beginning with the non-multi still-picture RAW image data, in descending order of size. That is, development processing is performed sequentially in the order of the still-picture RAW 415, the still-picture RAW 411, the still-picture RAW 416, the still-picture RAW 412, the multi-shot RAW 413, and, finally, the multi-shot RAW 414. By determining the sequential order of development processing for RAW files on the basis of the mode of shooting in this way, it is possible to secure the free space of the recording medium 152 earlier.

The sequential order of development processing for moving-picture RAW image data may be determined depending on the compression ratio of the moving-picture RAW image data. For example, in a case where it is possible to select an irreversible compression (lossy compression) scheme or a reversible compression (lossless compression) scheme for RAW image data compression when RAW image data is recorded, compressed RAW image data recorded in the recording medium 152 includes data conforming to the irreversible compression scheme and data conforming to the reversible compression scheme in a mixed manner. In general, the compression ratio of the reversible compression scheme is lower than that of the irreversible compression scheme (i.e., data amount after compression is larger). Given the same length of moving-picture data recording time, however, the time taken for developing data compressed using the irreversible compression scheme, the compression ratio of which is higher, is the same as the time taken for developing data compressed using the reversible compression scheme, the compression ratio of which is lower. Therefore, if the moving-picture RAW image data of the lower compression ratio is developed first, it is possible to delete the RAW image data that is larger in size earlier. Even if pieces of moving-picture data differ in recording time from one another, it is efficient to take, into consideration, the amount of data that can be developed per unit time. Therefore, development processing is performed with a priority given to the moving-picture RAW image data of the lower compression ratio, irrespective of moving-picture recording time.

The sequential order of development processing may be determined depending on the "after-compression-coding" size of developed images. For example, the size of developed images after compression coding is estimated on the basis of the preset number of imaging pixels and the preset image quality (compression ratio), and the sequential order of development processing is determined on the basis of the estimated size. The free space of the recording medium 152 increases as a result of deleting RAW image data after development processing but decreases as a result of storing the file of the developed image after compression coding. Therefore, by starting development processing with an image that requires a smaller space for file storage after compression coding, it is possible to secure the free space of the recording medium 152 earlier.

Priority conditions to be considered when determining the sequential order of development processing may have been set by the user in advance via the operation unit 162. The apparatus may be provided with a shooting mode in which a priority is given to the storage of RAW image data, and a lower order of priority may be given (processed later in the sequential order) to development processing for RAW image data that was shot under the settings of said shooting mode by the user.

The sequential order of development processing for RAW image data matters especially when the free space of the recording medium 152 has become scarce. Therefore, development processing may be performed in the sequential order of recording RAW image data into the recording medium 152 unless the free space of the recording medium 152 becomes less than predetermined capacity.

As described above, there are some methods for determining the sequential order of development processing for RAW image data. The sequential order may be determined on the basis of any one method. Alternatively, plural methods may be combined depending on the mode of shooting, the conditions of shooting, the user settings, etc.

As described above, in the present embodiment, the recording of a RAW image is performed in response to a recording start instruction given by the user, and development processing is performed during an interval between shooting and the next shooting or when in a state in which the processing load of the apparatus is comparatively light, for example, a light-load state in the playback mode or a sleep state (idle state). By this means, as compared with a case where development processing is performed concurrently with shooting, it is possible to reduce or eliminate a delay till playback output without a decrease in the quality of an image obtained by the imaging unit 102.

Recorded RAW image data that was not set by the user as the need-to-be-stored image data at the time of shooting is deleted from the recording medium 152 after the recording of developed image data after the development of the RAW image data. Therefore, it is possible to secure the free space of the recording medium while storing only images needed by the user.

In the present embodiment, in accordance with the types of images of the target of storage preset by the user, the sequential order is determined for RAW image data that are to be developed. By this means, it is possible to secure the free space of the recording medium earlier. This is advantageous for enhancement of shooting functions, for example, for increasing the speed of continuous shooting, increasing the number of pixels per frame, increasing the frame rate, or ensuring long shooting time, etc.

In the structure described in the present embodiment, the user sets the types of images of the target of storage. However, developed images (compressed images) may be generated and stored automatically from all RAW images, and the user may set whether to store the original RAW images only or not. In this case, in S302 of FIG. 3, all RAW images for which developed images have not been recorded are the target of development processing. The sequential order of development processing is determined as described earlier in S302.

RAW image data is high-quality data without any significant loss in image quality from the image data supplied from the sensor signal processing unit 103. However, since RAW image data is yet-to-be-developed data, it cannot be used directly for display or printing, meaning that development time is necessary. Moreover, since RAW image data does not conform to a known coding scheme such as JPEG, an environment in which it is possible to deal with RAW image data is limited. However, in the present embodiment, since development processing is performed after the recording of a RAW image during an interval between shooting and the next shooting or when in a state in which the processing load of the apparatus is comparatively light, for example, a light-load state in the playback mode or a sleep state (idle state), it is possible to use the apparatus in an operation environment equivalent to a conventional environment while maintaining high shooting functionality without a delay in development processing (playback output) in response to a request for display or printing, etc. after shooting.

Other Embodiments

Other embodiments of the present invention may be embodied by supplying, to a system or an apparatus via a network or in the form of a storage medium, a program for realizing and implementing at least one of the functions of the embodiment described above, and by causing at least one or more processor(s) in the system or the apparatus to read out and run the program. Embodiments of the present invention may be embodied by means of circuitry realizing and implementing at least one of the functions of the embodiment described above (for example, ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-229042, filed Nov. 24, 2015, and No. 2016-184690, filed Sep. 21, 2016, which are hereby incorporated by reference herein in their entirety.

What is claimed is:

1. An imaging apparatus comprising:
an imaging unit;
a generation unit configured to generate RAW image data by using image data acquired by the imaging unit;
a recording unit configured to record the RAW image data generated by the generation unit into a recording medium in accordance with a recording instruction;
a setting unit configured to control whether to set, as a target of storage into the recording medium, the RAW image data to be recorded into the recording medium by the recording unit in accordance with the recording instruction or not in accordance with a user instruction;
a development unit configured to generate developed image data by performing development processing on RAW image data; and
a control unit configured to control the development unit to automatically develop the RAW image data recorded in the recording medium after recording of the RAW image data into the recording medium by the recording unit and configured to control the recording unit to automatically record the developed image data, which is generated by developing the RAW image data by the development unit, into the recording medium, wherein
in a case where first RAW image data not set as the target of storage into the recording medium has been developed by the development unit, the control unit performs control to automatically delete the first RAW image data from the recording medium, and, in a case where second RAW image data set as the target of storage into the recording medium has been developed by the development unit, the control unit performs control not to delete the second RAW image data from the recording medium.

2. An apparatus according to claim 1, wherein
the control unit controls the development unit to automatically develop plural pieces of the RAW image data recorded in the recording medium and controls the recording unit to automatically record plural pieces of the developed image data generated by the development unit into the recording medium.

3. An apparatus according to claim 2, wherein
the control unit controls the recording unit to, each time when one of plural pieces of the developed image data generated by developing, by the development unit, respective pieces of the RAW image data not set as the target of storage is recorded, delete the RAW image data that corresponds to the recorded one of the plural pieces of the developed image data from the recording medium.

4. An apparatus according to claim 2, wherein
the control unit determines sequential order of development processing by the development unit for the plural pieces of the RAW image data recorded in the recording medium in such a way that the RAW image data not set as the target of storage is to be developed before the RAW image data set as the target of storage.

5. An apparatus according to claim 2, wherein
in a case where plural pieces of the RAW image data not set as the target of storage are recorded in the recording medium, sequential order of development processing by the development unit for the plural pieces of the RAW image data not set as the target of storage is determined on the basis of data amount of the plural pieces of the RAW image data not set as the target of storage.

6. An apparatus according to claim 1, wherein
the recording unit records, into the recording medium, identification information for identification as to whether the RAW image data recorded in the recording medium has been set as the target of storage or not; and
on the basis of the identification information recorded in the recording medium, the control unit determines whether to delete the RAW image data from the recording medium or not when the RAW image data has been developed by the development unit.

7. An apparatus according to claim 1, wherein
the control unit controls the development unit to automatically develop the RAW image data recorded in the recording medium when the imaging apparatus is in a predetermined idle state.

8. An apparatus according to claim 1, further comprising:
a mode switching unit configured to set one of a plurality of recording modes in accordance with a user instruction, the plurality of recording modes including a first recording mode and a second recording mode, the first recording mode being a mode in which a developed image is recorded, the second recording mode being a mode in which both a RAW image and a developed image are recorded; wherein
the recording unit records the RAW image data generated by the generation unit into the recording medium in accordance with the recording instruction both in the first recording mode and the second recording mode, and
wherein, in accordance with the set mode, the setting unit controls whether to set, as the target of storage into the recording medium, the RAW image data to be recorded into the recording medium by the recording unit or not.

9. An apparatus according to claim 1, wherein
the development unit performs first development processing and second development processing, a processing load of the second development processing being heavier than a processing load of the first development processing;
in a recording standby state, the development unit applies the first development processing to the RAW image data generated by the generation unit, and image data obtained as a result of the first development processing is outputted to a display unit, and
the control unit controls the development unit to automatically apply the second development processing to the RAW image data recorded in the recording medium after the recording of the RAW image data into the recording medium by the recording unit.

10. An imaging apparatus comprising:
an imaging unit;
a generation unit configured to generate RAW image data by using image data acquired by the imaging unit;
a setting unit configured to set one of a plurality of recording modes including a RAW image recording mode and a developed image recording mode;
a recording unit configured to record the RAW image data generated by the generation unit into a recording medium in accordance with a recording instruction;
a development unit configured to generate developed image data by performing development processing on RAW image data; and
a control unit configured to control the development unit to automatically develop the RAW image data recorded in the recording medium after recording of the RAW image data into the recording medium by the recording unit and configured to control the recording unit to automatically record the developed image data, which is generated by developing the RAW image data by the development unit, into the recording medium, wherein
when the recording mode of the RAW image data recorded in the recording medium is a first recording mode, the control unit performs control to automatically delete the RAW image data from the recording medium in a case where developed image data generated by developing the RAW image data by the development unit is to be recorded in the recording medium, and when the recording mode of the RAW image data recorded in the recording medium is a second recording mode, the control unit performs control not to automatically delete the RAW image data from the recording medium in a case where the developed image data generated by developing the RAW image data by the development unit is to be recorded in the recording medium.

11. An apparatus according to claim 10, wherein
in a case where the RAW image data recorded in the recording medium in the RAW image recording mode has been developed by the development unit, the control unit performs control not to delete the RAW image data recorded in the recording medium in the RAW image recording mode.

12. An apparatus according to claim 10, wherein
the control unit controls the development unit to automatically develop plural pieces of the RAW image data recorded in the recording medium and controls the recording unit to automatically record plural pieces of the developed image data generated by the development unit into the recording medium.

13. An apparatus according to claim 12, wherein
the control unit controls the recording unit to, each time when one of plural pieces of the developed image data generated by developing, by the development unit, respective pieces of the RAW image data recorded in the developed image recording mode is recorded, delete the RAW image data that corresponds to the recorded one of the plural pieces of the developed image data from the recording medium.

14. An apparatus according to claim 12, wherein
the control unit determines sequential order of development processing by the development unit for the plural pieces of the RAW image data recorded in the recording medium in such a way that the RAW image data recorded in the recording medium in the developed image recording mode is to be developed before the RAW image data recorded in the recording medium in the RAW image recording mode.

15. An apparatus according to claim 12, wherein
in a case where plural pieces of the RAW image data are recorded in the developed image recording mode, the control unit determines sequential order of development processing by the development unit for the plural pieces of the RAW image data recorded in the developed image recording mode on the basis of data amount of the plural pieces of the RAW image data recorded in the developed image recording mode.

16. An apparatus according to claim 10, wherein
the recording unit records, into the recording medium, identification information for identifying the recording mode set by the setting unit; and on the basis of the identification information recorded in the recording medium, the control unit determines whether to delete the RAW image data from the recording medium or not when the RAW image data has been developed by the development unit.

17. An apparatus according to claim 10, wherein the control unit controls the development unit to automatically develop the RAW image data recorded in the recording medium when the imaging apparatus is in a predetermined idle state.

18. An apparatus according to claim 10, wherein the development unit performs first development processing and second development processing, a processing load of the second development processing being heavier than a processing load of the first development processing;

in a recording standby state, the development unit applies the first development processing to the RAW image data generated by the generation unit, and image data obtained as a result of the first development processing is outputted to a display unit, and the control unit controls the development unit to automatically apply the second development processing to the RAW image data recorded in the recording medium after the recording of the RAW image data into the recording medium by the recording unit.

19. A recording method comprising:

generating RAW image data by using image data acquired as a result of imaging;

recording the generated RAW image data into a recording medium in accordance with a recording instruction;

controlling whether to set, as a target of storage into the recording medium, the RAW image data to be recorded into the recording medium in accordance with the recording instruction or not in accordance with a user instruction;

performing development processing on RAW image data; and automatically developing the RAW image data recorded in the recording medium after the recording of the RAW image data into the recording medium and automatically recording the developed image data, which is generated by developing the RAW image data, into the recording medium, wherein in a case where first RAW image data not set as the target of storage into the recording medium has been developed in the development, control is performed to automatically delete the first RAW image data from the recording medium, and, in a case where second RAW image data set as the target of storage into the recording medium has been developed in the development, control is performed not to delete the second RAW image data from the recording medium.

* * * * *